United States Patent [19]

Latta, Jr.

[11] Patent Number: 4,559,518
[45] Date of Patent: * Dec. 17, 1985

[54] SCHOOL BUS STOP SIGN AND CROSSING ARM APPARATUS

[75] Inventor: Joseph E. Latta, Jr., Hillsborough, N.C.

[73] Assignee: Specialty Manufacturing Co., Charlotte, N.C.

[*] Notice: The portion of the term of this patent subsequent to Sep. 13, 1997 has been disclaimed.

[21] Appl. No.: 421,461

[22] Filed: Sep. 22, 1982

[51] Int. Cl.$^4$ .............................................. B60Q 1/46
[52] U.S. Cl. ................................. 340/130; 340/133; 340/81 R; 116/28 R; 116/63 R
[58] Field of Search ............... 340/130, 133, 81 R, 340/83, 142, 107, 127, 129, 120; 116/63 R, 28 R

[56] References Cited

U.S. PATENT DOCUMENTS

| 2,144,813 | 1/1939 | Roan et al. | 340/130 |
| 2,384,689 | 4/1943 | Moose | 340/107 |
| 3,153,398 | 10/1964 | Runkle et al. | 116/28 R |
| 4,138,668 | 2/1979 | Latta, Jr. et al. | 340/130 |
| 4,339,744 | 7/1982 | Latta, Jr. | 340/133 |

Primary Examiner—John W. Caldwell, Sr.
Assistant Examiner—Ellwood G. Harding
Attorney, Agent, or Firm—Shefte, Pinckney & Sawyer

[57] ABSTRACT

An electrically-powered school bus sign and crossing arm apparatus mounts on the school bus body. A unidirectional DC motor and associated linkage and limit switch controls are used to deploy and retract the stop sign blade and crossing arm.

10 Claims, 6 Drawing Figures

SCHOOL BUS STOP SIGN AND CROSSING ARM APPARATUS

DESCRIPTION

1. Technical Field

The present invention relates generally to apparatus for deploying a sign. More particularly, the invention relates to apparatus for electromechanically deploying school bus stop sign and crossing arm apparatus.

2. Background Art

A comprehensive review of the prior art is to be found in applicant's prior U.S. Pat. Nos. 4,138,668 and 4,339,744 which will therefore not be repeated.

Applicant's prior U.S. Pat. Nos. 4,138,668 and 4,339,744 teach an electrically-operated school bus stop sign which has proven in practice to offer many advantages over the conventional pneumatic system. The present invention will be noted as basically following the same electromechanical construction. However, with continued experience and use of the improved school bus sign taught by applicant's prior patents, applicant has discovered an electric relay control configuration which offers still further improvements over all known prior art as well as over applicant's prior patents. Also, government regulations and practices vary from State to State within the United States and applicant has found a need for a more versatile wiring and control system and which is easier to install. Further, with the advent of use of pneumatically-operated crossing arms, applicant provides with the present invention a school bus signaling system in which both a crossing arm and stop sign on a school bus can be electrically operated together with an improved relay control and wiring configuration and while retaining the uni-directional motor and uni-directional mode of operation employed in the school bus sign of applicant's prior U.S. Pat. No. 4,339,744.

DISCLOSURE OF INVENTION

The school bus stop sign and crossing arm apparatus of the present invention basically follows the construction described in applicant's prior patents and which may be referred to for reference. As in the school bus stop sign of the prior patents, there is provided an actuating mechanism located in a housing mounted on the side of the bus and connecting a DC drive motor to the sign. A similar mechanism is provided on the front bumper and operates a crossing arm to insure that the pupils on departure walk well in front of the bus. The actuating mechanism for both the sign and crossing arm are arranged in conjunction with the wiring circuit such that a rotatable arm driven by the shaft of the drive motor moves the sign in and out through a connecting rod and actuates a pair of limit switches as the motor shaft always turns in the same direction. As compared to the wiring system of the prior patents, the present invention employs a relay in both the sign and crossing arm apparatus and controls this relay with an on-off switch which in a preferred embodiment is dependent on the school bus door position so that both the school bus sign and crossing arm can be deployed and retracted with opening and closing of the door. The driver's responsibilities are thus substantially reduced. The school bus stop sign of the present invention thus eliminates the need for installing a double pole, double throw deploy-retract switch as in U.S. Pat. No. 4,339,744, reduces the complexity of the wiring terminals, provides for an easier installed system, adapts more readily to the widely varying school bus regulations and practices and allows both the stop sign and crossing arm to be electrically operated and in one embodiment automatically in conjunction with opening and closing of the school bus door.

BEST MODE FOR CARRYING OUT THE INVENTION

Details of the school bus stop sign apparatus construction described in applicant's prior U.S. Pat. No. 4,339,744 will be given along with a description of the improved relay control circuitry and operation of the present invention. From this description, the similar crossing arm apparatus will be understood and from later description how both the school bus stop sign and crossing arm apparatus are used with the improved relay control and wiring arrangement of the invention.

Figure 1:
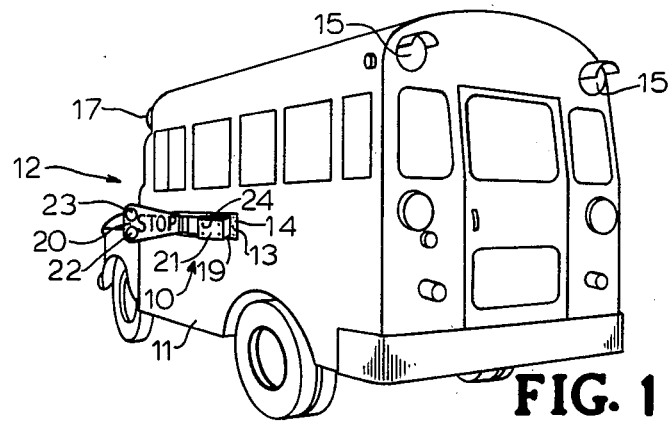
FIG. 1 is a pictorial view of a school bus with the invention stop sign unit partially recessed in the outside panel of the bus on the driver side thereof.
Figure 2:
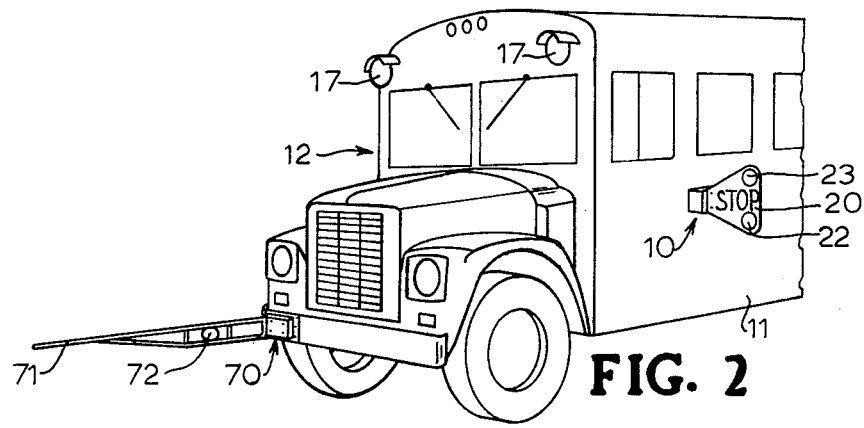
FIG. 2 is a fragmentary pictorial view of a school bus with the invention crossing arm unit mounted on the front bumper and showing the crossing arm and stop sign extended.

As illustrated in FIG. 1, the electrically-operated school bus stop sign unit 10 mounts partially recessed in the exterior side panel 11 of the body of school bus 12 and is held in place by screws 13 passing through flange 14 and secured into side panel 11. In FIG. 2, a similar electrically operated unit 70 is shown mounted on the front bumper of the school bus to operate a crossing arm 71 having an optional light 72. The mechanical, general construction and operation of school bus sign unit 10 and crossing arm unit 70 are similar. The construction and operation of school bus sign unit 10 is first explained from which the construction and operation of crossing arm unit 70 will be readily understood.

School bus stop sign unit 10 is normally installed on the driver side and includes a sign 20 which, in FIGS. 1 and 2, is shown deployed approximately 90° from bus 12 in a position where sign 20 is readily visible to both following and oncoming traffic. While not shown, it will be understood that the front main entrance door of the bus is on the opposite side of the bus. School bus stop sign unit 10 is electrically tied to the sign lights 22, 23 and rear and front bus body lights 15, 17 through the later described improved circuitry of the present invention. In the deployed position, invention unit 10, as later explained, causes lights 22, 23 to blink or flash along with lights 15 and 17 to alert drivers of nearby cars that bus 12 is either loading or unloading children. Other warning lights are also typically operated when the bus starts slowing down to stop and before it actually comes to a stop.

Housing 19, of school bus stop sign unit 10, is partially recessed within side panel 11. A cover 21 of housing 19 is removably secured to housing 19 by screws 24 to facilitate repairs of component parts of housing 19. Housing 19 includes a top housing portion 25 and a bottom housing portion 26. Housing portions 25, 26 are secured together by welding or other suitable means. Top portion 25 has the outwardly extending peripheral, thin, flat, mid-positioned flange 14 previously mentioned through which unit 10 is screwed into place. The school bus stop sign unit 10 can thus be recessed in the exterior side panel 11 so that the unit 10 is positioned between frame members (not shown) of bus 12.

Figure 3:
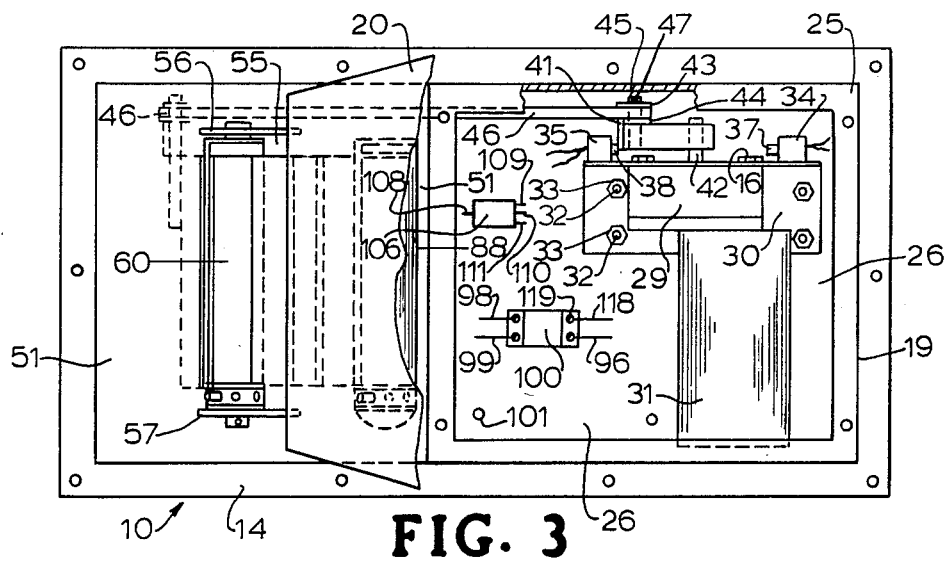
FIG. 3 is a plan view of the unit with the sign in a retracted position but with a large portion of the sign cut away, cover removed, the wiring eliminated and illustrating the position of the internal mechanism in the retracted position, a unit similar in construction being used for the crossing arm.

An L-shaped bracket 30 bolts into bottom housing portion 26 and mounts on its upright portion a uni-directionally operating DC motor 31 and associated gear housing 29, by means of bolts 16, the gears of which, although not shown, are driven uni-directionally by the shaft of motor 31. Bolts 32 are integral with bottom portion 26 and mount bracket 30 locked in place by nuts 33. The end of housing 19 which contains bracket 30, motor 31 and gear housing 29 is substantially deeper than the opposite end and its related mechanism and allows uni-directional rotation of arm 41. Normally-closed limit switches 34, 35 are also mounted on bracket 30, as seen in FIG. 3. Switches 34, 35 are fastened to bracket 30 by screws (not shown) which fasten into bracket 30. Sensing arms or springs 37, 38 are used to depress plungers 39, 40, respectively, as arm 41 contacts springs 37, 38 during the uni-directional travel of arm 41. Arm 41 is driven by shaft 42 of gear housing 29. Arm 41 rotates uni-directionally and makes a clockwise revolution as shown by the arrow in FIG. 4. A stub shaft 45 is rigidly fixed on the outer surface of arm 41 opposite and parallel to shaft 42 and extends beyond a sufficient distance to provide a mount. Connecting rod 46 mounts pivotally upon shaft 45, with washers 43, 44 on either side, and is held in place by cotter pin 47. The rearwardly disposed end of housing 19 which contains motor 31 and gear housing 29 is considerably deeper than the opposite forward end. An opening 55 in wall 51 has adjacent thereto a pair of outwardly extending brackets 56, 57 rigidly secured to wall 51. Brackets 56, 57 receive pivotally therebetween a spring-loaded cylinder 60 of the type conventionally used in two-way swinging doors, and the like. Cylinder 60 is capable of being adjusted for spring tension.

Through appropriate linkage, as explained in the prior patent, a second cylinder 88 is connected operatively with cylinder 60. From cylinder 88, also as explained in the prior patent, appropriate linkage extends to and connects with sign 20. Sign 20 is deployed and retracted through operation of connecting rod 46 and cylinders 60 and 88.

In the illustrated embodiment of the improved relay control circuit of the present invention bus battery 95 is connected through wire 96 to a terminal 100c of a relay switch 100 located within housing 19. Terminal 100a on one side of relay switch 100 is in the "deploy" circuit and through wire 98 connects to terminal 34a on one side of normally closed limit switch 34. Terminal 100b on the opposite side of relay switch 100 is in the "retract" circuit and through wire 99 connects to terminal 35a on one side of limit switch 35. Relay arm 115 is normally in the solid line position shown in FIG. 4 and in such position connects terminals 100c and 100b corresponding to the retract position. While not shown in FIGS. 1 and 2, it will be understood that in many states the school bus is provided with an on-off body light control switch 117 operated by the front door. Door switch 117 is utilized in the present invention. When the school bus door is opened by the driver, relay control coil or solenoid 116 is energized by closing of the normally-open door switch 117 through wire 118 connected to terminal 119 and arm 115 is positioned by solenoid 116 to the dashed line position shown in FIG. 4 which connects terminals 100c and 100a corresponding to the deploy position. Wire 102 connects terminal 34b of the opposite side of normally closed switch 34 and terminal 35b of the opposite side of switch 35. Motor 31 through wire 104 and junction 103 connects to wire 102 and is grounded through wire 105.

Flasher switch 106 is connected through wire 108 and junction 107 to wire 98. Sign lights 22, 23 are in turn connected through wires 109, 110 to flasher switch 106 and to ground through wire 114. Also, bus body rear and front lights 15, 17 are connected to flasher switch 106 through wire 111 and are grounded through wire 112. Wires 98, 99 and 109-111 are conveniently bundled and pass into housing 19 through a single hole 101. Lights 15, 17 and 22, 23 thus flash when the school bus door is open.

When the school bus door is closed by the school bus driver, door switch 117 is open and relay arm 115 is in the off or "retract" position, arm 41 rests in contact with spring 38 of limit switch 35 which maintains lights 15, 17, 22. 23 in a non-flashing condition. Thus, when the school bus door is open, the door switch 117 is closed and relay arm 115 moves to the on or "deployed" position, as in FIG. 4, arm 41 rests in contact with spring 37 of limit switch 34 which turns lights 15, 17, 22, 23 to an on and flashing condition through flasher switch 106 which is conveniently located within housing 19 and can be replaced easily when the need arises. Sign 20 is normally in the retracted position. Bus lights 15, 17 and sign lights 22, 23 15 continue to flash as long as door switch 117 is closed, with the school bus door open. In moving from one position to the other, motor 31 always operates in one direction.

Figures 4, 5:
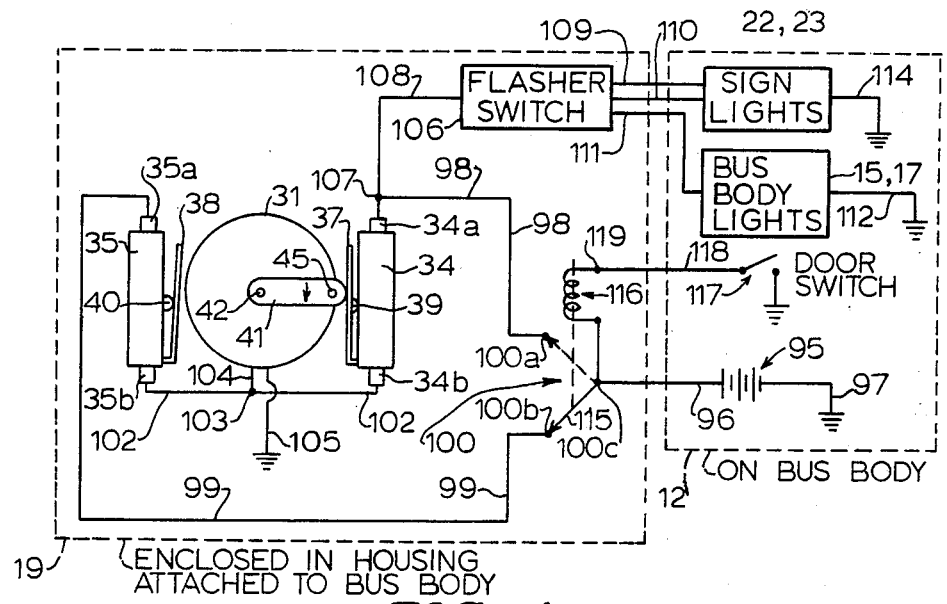
FIG. 4 is a circuit diagram showing the circuitry for deploying and for retracting the stop sign and for flashing the bus body and sign lights.
FIG. 5 is a block diagram of a system according to the invention in which both the stop sign and crossing arm are controlled automatically from the bus door switch through a relay control using two relays.

Since the school bus sign circuit typically operates the sign lights and bus body lights, the crossing arm circuit does not require the flasher switch or the sign and bus body lights shown in FIG. 4. That is, the operating mechanism of FIG. 3 when applied as a crossing arm operator only requires an electrical connection to the door switch 117 and battery 95 when the door switch is used as the control switch as in FIG. 4.

After the pupils have been discharged from the bus, to retract sign 20, the bus door is closed by the driver which causes door switch 117 to open and relay arm 115 to be flipped to the retract position, which allows motor 31 to move arm 41 forward in the same direction as before to contact switch 35. When arm 41 reaches and contacts spring 38 of limit switch 35, motor 31 stops and sign 20 is held in the retracted position 25 and lights 15, 17, 22, 23 are turned off.

FIG. 5 illustrates the described relay control system of the invention operating both the stop sign and crossing arm utilizing two relays and without a light on the crossing arm. As compared to the circuitry of the prior patents, it can be seen that the need for installing a separate double pole, double throw control switch to operate the stop sign and where applicable the crossing arm has been eliminated. Thus, both the stop sign and crossing arm can be electrically and automatically operated by opening and closing the bus door and using the door switch to operate the described relay controls. While not shown, it also can be recognized that the described relay control could be operated with a toggle switch used to operate the bus body lights or could be operated independently with a toggle switch while retaining the advantage of relay control and the dramatically improved ease of installation particularly in view of the varying government regulations and practices from state to state. In the typical on site or replacement installation for a school bus sign application all that is required to make the invention apparatus operational after being secured to the side of the bus is to connect wires 96, 111 and 118 since all the other connections will have been made at the factory. Thus, the need to properly locate, install and wire a special double pole, double throw switch to control the apparatus has been eliminated. In the type of application where a guard arm is also being installed only two wiring connections would need to be made namely the respective wiring connections to the door switch 117 and battery 95.

Figure 6:
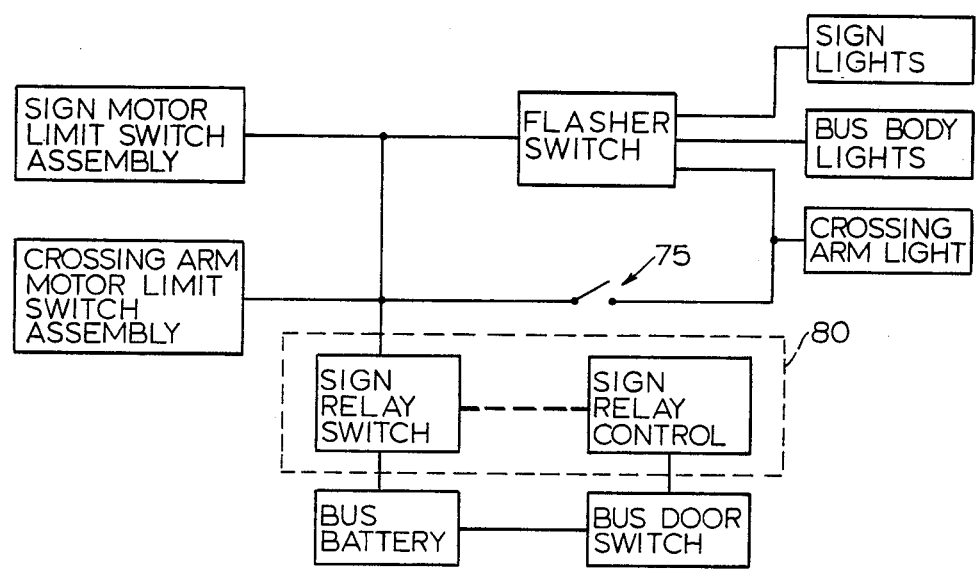
FIG. 6 is a block diagram of a system according to the invention in which both the stop sign and crossing arm are controlled automatically from the bus door switch through a relay control.

FIG. 6 further illustrates the versatility and advantages of the relay control system of the invention. In FIG. 6, it will be noted that a single relay 80 is used to operate both the sign and crossing arm mechanisms. Additionally, where a light is provided on the crossing arm such as light 72 on crossing arm 71 in FIG. 2, the relay control system of the invention allows the crossing arm light to be flashed with switch 75 of FIG. 6 open or to be operated continuously with switch 75 closed. Thus, depending on the local government regulations and practices the invention system adapts to either requirement.

I claim:

1. Electric battery operated apparatus for mounting and operating safety devices on a vehicle such as a school bus stop signal or crossing arm in coordination with accepting and discharging passengers and opening and closing the main entrance door on the vehicle, comprising in combination for each such safety device on the vehicle:
   (a) a housing having integrally joined walls to provide a box-like internal housing cavity and means enabling said housing to be releaseably secured to an exterior mounting surface of the vehicle;
   (b) a uni-directional DC motor mounted and secured within said housing;
   (c) a safety device mounting and linkage arrangement including switch actuator means positioned by said motor and linkage members connected to be actuated by said motor;
   (d) a safety device such as a school bus stop signal or crossing arm having an inner edge portion secured to said linkage members and adapted to being normally pivoted by said safety device mounting and linkage arrangement between a retracted position in which the safety device extends rearwardly and parallel to said mounting surface and a deployed position in which the safety device extends outwardly and perpendicular to said mounting surface;
   (e) first and second normally closed limit switches mounted in opposed positions proximate said motor and switch actuation means, said first switch being arranged to be contacted by said switch actuator means when said safety device is in said deployed position and said second switch being arranged to be contacted by said switch actuator means when said safety device is in said retracted position;
   (f) an electric control switch mounted on said vehicle and having first and second positions corresponding to deployment and retraction of said safety device; and
   (g) relay switching means including connecting wiring enabling said motor to be connected to the vehicle battery through a first relay established path and through said second limit switch in a first circuit configuration when said control switch is moved to its said first position with said actuator means being in contact with said first limit switch and in which first circuit configuration said linkage arrangement is actuated by said motor shaft rotating in a given direction to move said safety device to said deployed position whereupon said second limit switch is electrically opened by contact with said actuator means and said battery is disconnected from said motor and enabling said motor to be connected to the vehicle battery through a second relay established path and through said first limit switch in a second circuit configuration when said control switch is moved to its said second position with said actuator means being in contact with said second limit switch and in which said second circuit configuration said linkage arrangement is actuated by said motor shaft rotating in the same said direction to move said safety device to said retracted position whereupon said first limit switch is electrically opened by contact with said actuator means and said battery is disconnected from said motor.

2. Safety apparatus as claimed in claim 1 wherein said vehicle comprises a school bus, said control switch comprises a door switch mounted so as to be opened and closed by the opening and closing of the entrance door of said vehicle with the closed position of such door switch corresponding to the said deploy position and the open position of said door and with the open position of such door switch corresponding to the said retracted position and the closed position of said door.

3. Safety apparatus as claimed in claim 1 wherein said vehicle comprises a school bus and at least one of said safety devices comprises a school bus stop sign.

4. Safety apparatus as claimed in claim 2 wherein at least one of said safety devices comprises a school bus stop sign.

5. Safety apparatus as claimed in claim 1 wherein said vehicle comprises a school bus and at least one of said safety devices comprises a crossing arm.

6. Safety apparatus as claimed in claim 2 wherein at least one of said safety devices comprises a crossing arm.

7. Safety apparatus as claimed in claim 1 wherein said vehicle comprises a school bus and at least one of said safety devices comprises a school bus stop sign having warning lights mounted thereon and including second circuit means having a circuit interrupter, said first circuit means wiring being connected such that said sign warning lights are continuously energized by said battery through said circuit interrupter and independent of the electrical position of said first and second limit switches and electrically flash when and so long as said control switch is in its said first deploy position.

8. Safety apparatus as claimed in claim 1 wherein said vehicle comprises a school bus and wherein said safety devices include at least both a school bus stop sign and a crossing arm.

9. Safety apparatus as claimed in claim 6 and wherein said electric control switch comprises a single said control switch and said relay switching means comprises a pair of said relay switching means for operating said devices.

10. Safety apparatus as claimed in claim 6 and wherein said electric control switch comprises a single said control switch and said relay switching means comprises a single said relay switching means for operating said devices.

* * * * *